United States Patent
Ogawa et al.

[11] Patent Number: 6,056,444
[45] Date of Patent: May 2, 2000

[54] TRACK ROLLER BEARING WITH STUD

[75] Inventors: Yoshitaka Ogawa; Isao Ochiai, both of Gifu, Japan

[73] Assignee: Nippon Thompson Co., Ltd., Tokyo, Japan

[21] Appl. No.: 09/003,785

[22] Filed: Jan. 7, 1998

[30] Foreign Application Priority Data

Jan. 14, 1997 [JP] Japan ................................. 9-017349

[51] Int. Cl.[7] ........................................... F16C 19/00
[52] U.S. Cl. ........................ 384/475; 384/466; 184/105.3; 137/847
[58] Field of Search ........................ 384/462, 466, 384/473, 474, 475; 74/569; 184/105.3; 251/149.7; 137/846, 847

[56] References Cited

U.S. PATENT DOCUMENTS

| | | | |
|---|---|---|---|
| 2,265,554 | 12/1941 | Thomas | 74/569 |
| 2,598,002 | 5/1952 | Langdon | 137/846 X |
| 2,770,508 | 11/1956 | Smith | 74/569 X |
| 3,596,533 | 8/1971 | Nightingale | 74/569 X |
| 3,752,543 | 8/1973 | Schmidt | 384/484 |
| 4,106,826 | 8/1978 | Marola et al. | 74/569 X |
| 4,113,327 | 9/1978 | Koch | 384/482 |
| 5,261,459 | 11/1993 | Atkinson et al. | 137/846 |

FOREIGN PATENT DOCUMENTS

585920 11/1958 Italy ..................................... 184/105.3

*Primary Examiner*—David A. Bucci
*Assistant Examiner*—Brandon C. Stallman
*Attorney, Agent, or Firm*—Sughrue, Mion, Zinn Macpeak & Seas, PLLC

[57] ABSTRACT

The track roller bearing with stud according to the present invention is to provide a track roller bearing with stud that has a low production cost and offers easy handling in which lubrication work can be performed from either end surface of the stud and can be easily attached and removed from a machine tool and so forth. Lubricant supply port 21m continuing from the above hexagonal hole 21j is formed in addition to lubricant supply port 21n on the side of threaded portion 21e of stud 21 for the lubricant supply ports connected to lubricating paths 21g and 21h for supplying lubricant to rolling elements 24 and so forth, and lubricant supply plugs 31 are disposed in these lubricant supply ports.

4 Claims, 6 Drawing Sheets

TRACK ROLLER BEARING WITH STUD

BACKGROUND OF THE INVENTION

1. Field of the Invention

The present invention relates to a track roller bearing with stud for smoothly guiding linear motion and so forth in a machine tool or industrial robot and so forth, which is also commonly used as a cam follower.

2. Description of the Prior Art

Figure 1:
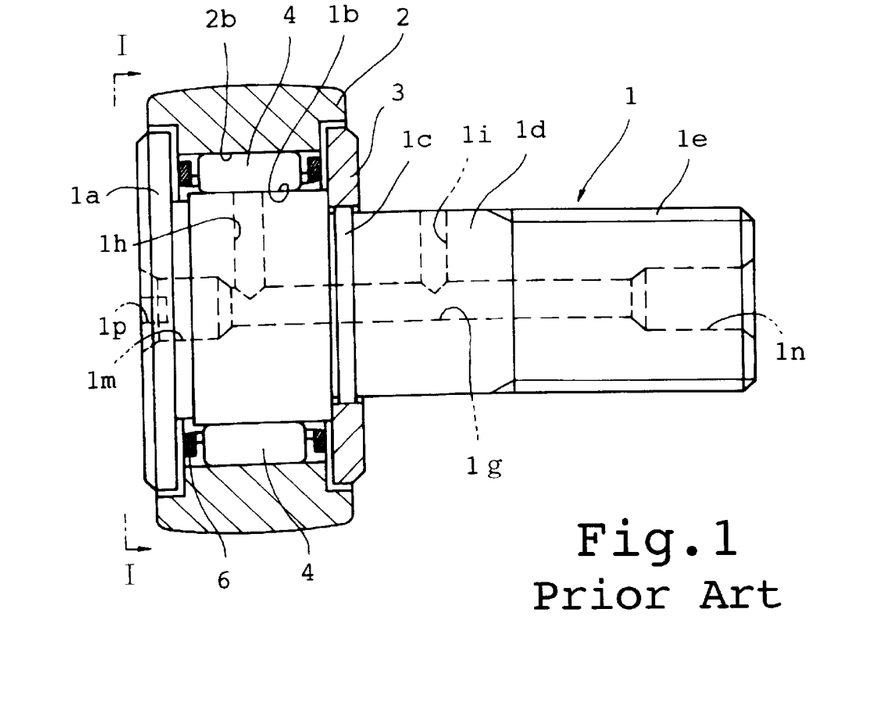
FIG. 1 is a front view, including a partial cross-section, of a track roller bearing with stud as an example of the prior art.

FIG. 1 is an example of a track roller bearing with stud of the prior art.

As shown in FIG. 1, this track roller bearing with stud is equipped with stud 1, outer ring 2, side plate 3, a plurality of rollers 4 and cage 6.

Stud 1 is composed in the shape of a shaft in which is formed, in order from one end surface, flange 1a, a track portion in the form of track surface 1b, side plate engaging portion 1c, attaching portion id and threaded portion 1e.

Outer ring 2 is in the form of a thick-walled ring in which one end is prevented from coming out in the axial direction by flange 1a and having a larger diameter than the outer diameter of the flange 1a. Track surface 2b is formed on the inside of outer ring 2. Outer ring 2 is installed while allowing to rotate freely corresponding to track surface 1b of stud 1.

A plurality of rollers 4 are juxtaposed in the form of rolling elements between track surfaces 1b and 2b.

In addition, cage 6 is provided which retains a plurality of rollers 4 between track surfaces 1b and 2b at mutual intervals.

Side plate 3 is located on the other end of outer ring 2 corresponding to flange 1a and is composed of a doughnut-shaped plate having a diameter similar to the outer diameter of the flange 1a. The inner diameter portion fits into side plate engaging portion 1c of stud 1 and prevents outer ring 2, a plurality of rollers 4 and cage 6 from coming out in the axial direction in cooperation with flange 1a.

In a track roller bearing with stud composed in this manner, outer ring 2 normally rotates relative to stud 1.

Stud 1 has lubricant supply hole 1g extending roughly over its entire length in its axial center. Lubricating holes 1h and 1i, which are respectively connected to track surface 1b and attaching portion 1d, are opened in the supply hole 1g. These supply hole 1g, lubricating holes 1h and 1i form a lubricating path for lubricant. Lubricant supply ports 1m and 1n are formed in both end surfaces of stud 1. These lubricant supply ports 1m and 1n serve as lubricating oil intake ports for lubricant that pass through the lubricating path.

Figure 2:
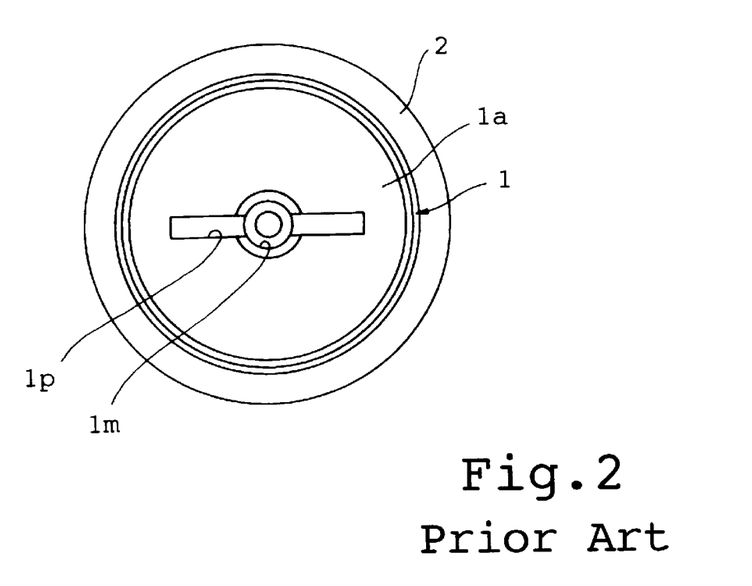
FIG. 2 is a view taken along arrows I—I of the track roller bearing with stud shown in FIG. 1.

In addition, as shown in FIG. 2, slotted screwdriver groove 1p is formed in the end surface on the side of flange 1a of stud 1.

Figure 3:
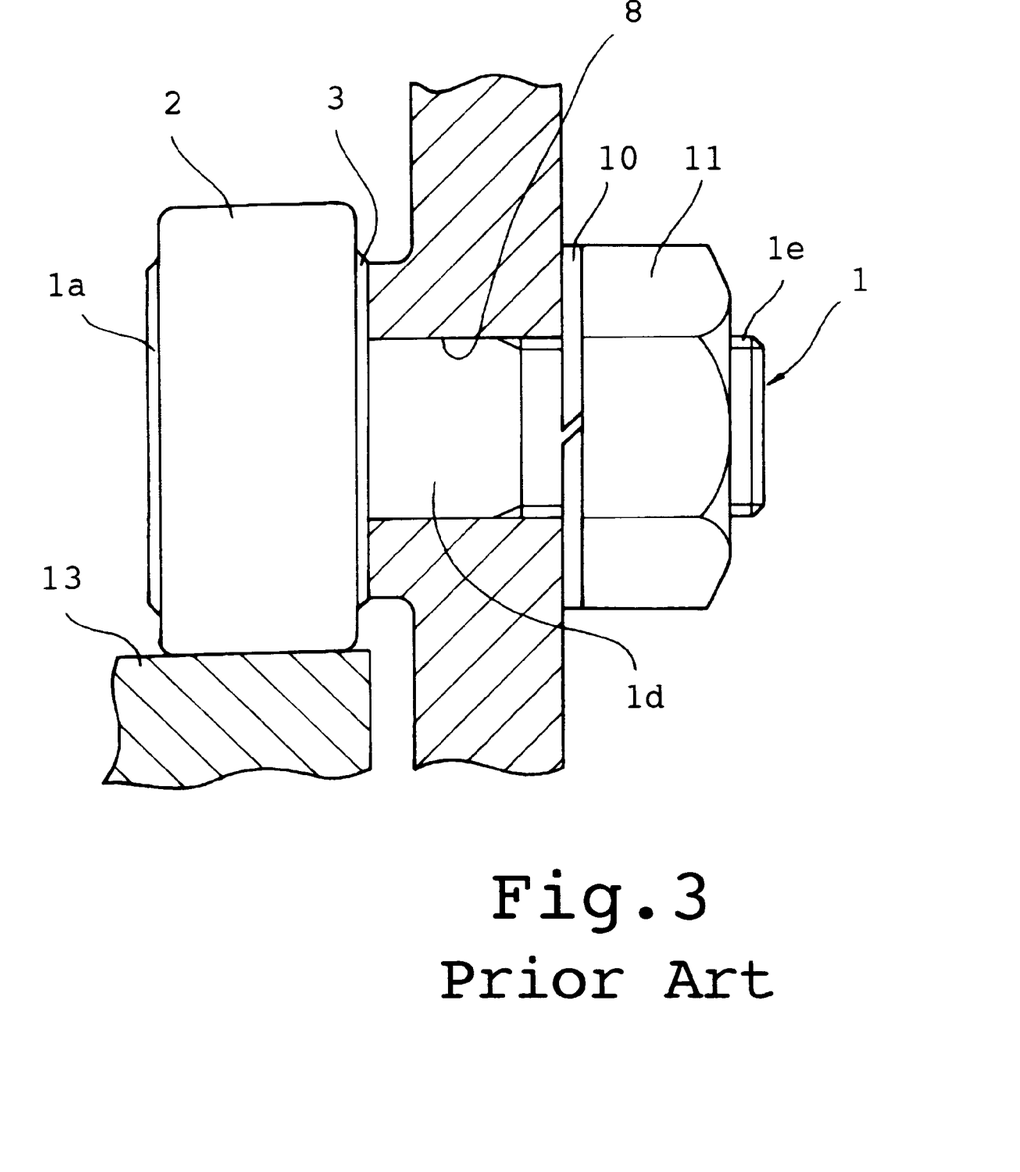
FIG. 3 is a front view, including a partial cross-section, that shows the state in which the track roller bearing with stud shown in FIG. 1 is attached to a portion of an apparatus.

FIG. 3 shows an example of typical usage of a track roller bearing with stud.

As shown in FIG. 3, stud 1 of the track roller bearing with stud is inserted into housing 8 of a frame equipped on a machine tool and so forth, nut 11 is screwed onto threaded portion 1e of stud 1 protruding from the opposite side of the frame by means of spring washer 10, and the track roller bearing with stud is tightened to fix in position by either turning this nut 11 with a wrench and so forth or by engaging a screwdriver into slotted screwdriver groove 1p and turning stud 1.

Normally, the surface of the outer diameter of outer ring 2 makes sliding contact with the track of a linear path or the track of a cam mechanism in the form of track 13 which causes outer ring 2 to rotate resulting in relative motion with the track 13.

In the attached state described above, in the case of lubricating with grease, a grease supply device in the form of a grease nipple is attached to either of lubricant supply ports 1m or 1n, whichever makes lubrication work easier. The lubricant supply port that is not used is inserted and blocked with an embedded plug. In addition, lubricating hole 1i, which opens into attaching portion 1d of stud 1, is blocked by housing 8. A suitable amount of grease is supplied by a grease gun and so forth into the grease nipple which causes lubricant in the form of grease to fill in the inside of the lubricating path. This results in grease being supplied to track surfaces 1b and 2b of stud 1 and outer ring 2 as well as rollers 4 from lubricating hole 1h.

Figure 4:
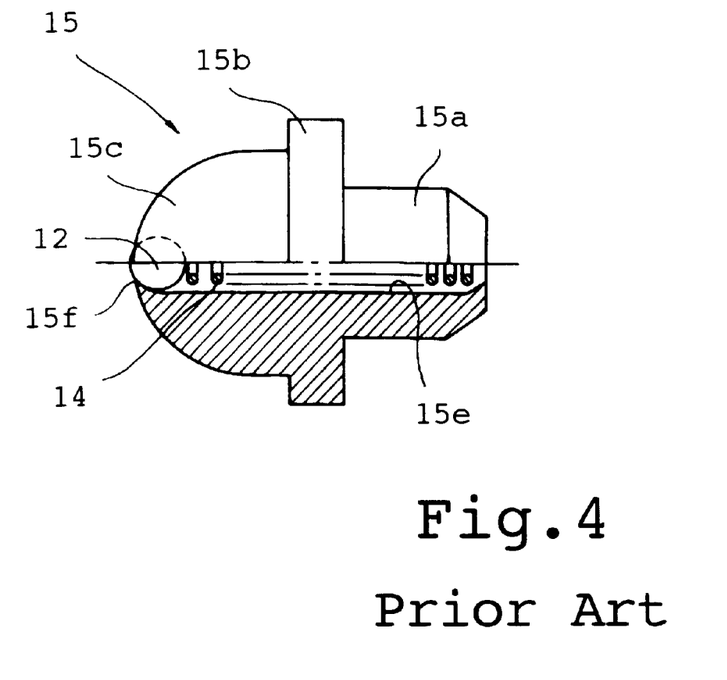
FIG. 4 is a front view, including a partial cross-section, of a grease nipple attached to the track roller bearing with stud shown in FIG. 1.
Figure 5:
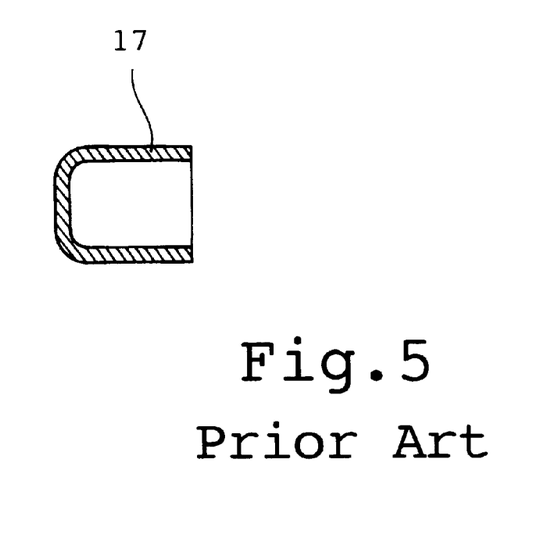
FIG. 5 is a cross-sectional view in the axial direction of an embedded plug attached to the track roller bearing with stud shown in FIG. 1.

FIG. 4 shows grease nipple 15 attached to the stud 1, while FIG. 5 shows embedded plug 17.

As shown in FIGS. 4 and 5, grease nipple 15 has engaging portion 15a, which is able to engage with lubricant supply ports 1m and 1n, flange 15b continuing from the engaging portion 15a, and lubricant supply portion 15c. Lubricant port 15e is formed in the center of its axis. Steel ball 12 is arranged on the side of lubricant supply portion 15c of this lubricant supply port 15e, which is also provided with compressed coil spring 14 that applies force to the steel ball 12. The steel ball 12 acts as a check valve that blocks lubricant supply port 15f.

On the other hand, embedded plug 17 is formed to have a cross-section in the shape of a circular cup. This is formed by press forming a thin steel sheet.

Figure 6:
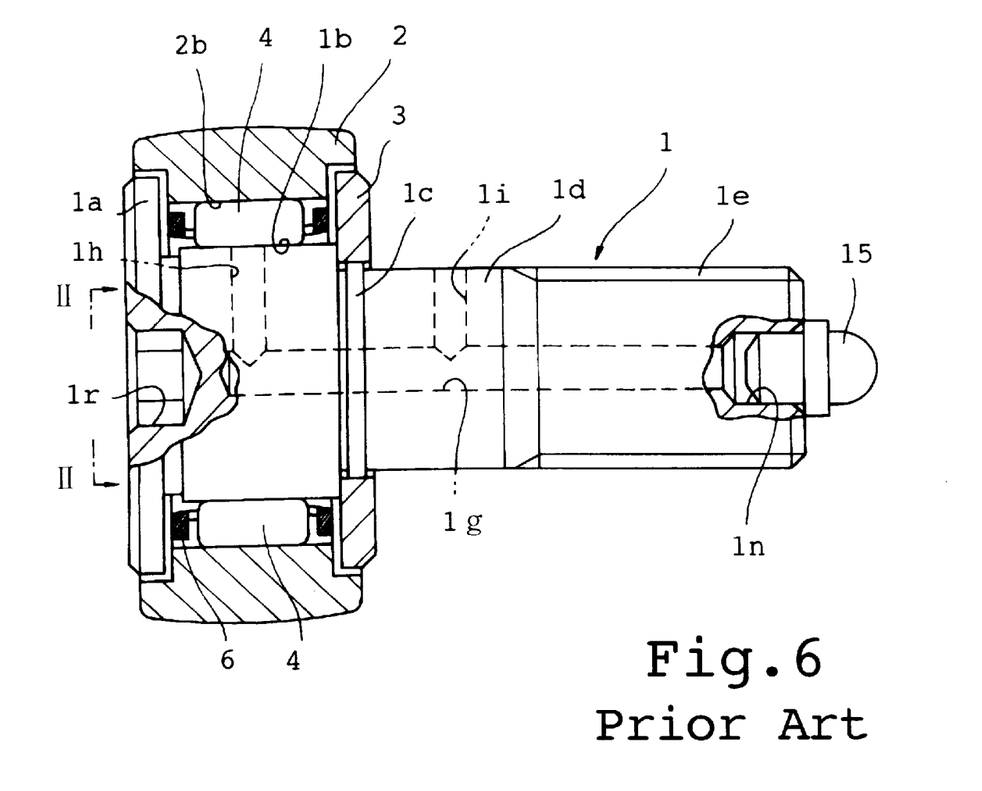
FIG. 6 is a front view, including a partial cross-section, of a track roller bearing with stud as another example of the prior art.
Figure 7:
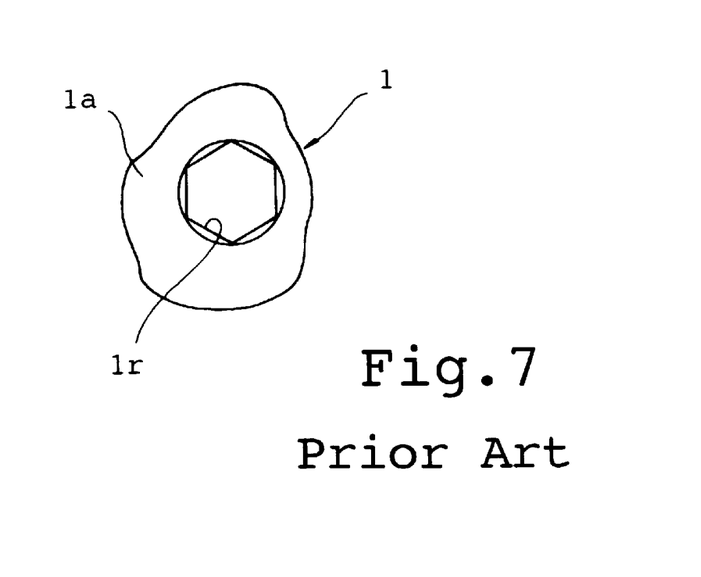
FIG. 7 is a view taken along arrows II—II of the track roller bearing with stud shown in FIG. 6.

FIGS. 6 and 7 show a track roller bearing with stud as another example of the prior art.

This track roller bearing with stud is composed in the same manner as the above track roller bearing with stud with the exception of the points described below, and the same reference numerals are used for those constituent members that are identical or corresponding to the track roller bearing with stud described above.

Hexagonal hole 1r is formed in the end surface on the flange side of stud 1 of this track roller bearing with stud instead of the slotted screwdriver groove 1p. When attaching or removing, such as a hexagonal wrench is inserted into this hexagonal hole 1r to turn stud 1. This track roller bearing with stud having hexagonal hole 1r allows tightening to be performed more reliably than that having slotted screwdriver groove 1p, thereby offering the advantage of a more secure installation.

In addition, in terms of processing as well, although the slotted screwdriver groove had to be processed by cutting such as that involving the use of a milling cutter and soon, since that having hexagonal hole 1r offers the advantages of hexagonal hole 1r being able to be formed simultaneous to forging when obtaining the parent form of stud 1, thereby reducing the number of processing steps, and not having the processing difficulty associated with the ordinary slotted screwdriver groove 1p, it has come to be widely used in recent years.

However, in the track roller bearing with stud having hexagonal hole 1r, lubricant supply port in is only provided on the end surface on the side of threaded portion 1e of stud 1, and grease nipple 15 is attached to the lubricant supply port 1n.

At present, track roller bearings with studs are widely used in various technical fields, and there is an extremely high demand for them. There is therefore a need for a track roller bearing with a stud having a hexagonal hole that offers even easier handling.

The track roller bearing with stud having hexagonal hole 1r that has come into wide use in recent years has the problem of the lubricant supply port to which grease nipple 15 can be attached only being provided on the side opposite from the hexagonal hole 1r, thus making it necessary to only provide lubrication from one side.

SUMMARY OF THE INVENTION

In consideration of the above problems of the prior art, the object of the present invention is to provide a track roller bearing with stud that has a low production cost, offers easy handling in which lubrication work can be performed from either end of the stud, and can be easily attached and removed from a machine tool and so forth.

In order to achieve the above object, the track roller bearing with stud of the present invention is comprises a stud in the shape of a shaft in which is formed, in order from one end surface, a flange, a track portion in which the outer circumference serves as the track surface, a side plate engaging portion, an attaching portion and a threaded portion; an outer ring, one end of which serves to prevent from coming out in the axial direction by the flange, in the form of a thick-walled ring having a diameter larger than the outer diameter of the flange, having a track surface formed on its inner circumference and inserted while allowing to rotate freely corresponding to the track surface of the stud; a plurality of rolling elements juxtaposed between the track surfaces; and, a side plate in the form of a doughnut-shaped plate similar in size to the outer diameter of the flange, located on the other end of the outer ring corresponding to the flange, the inner diameter portion which engages with the side plate engaging portion, and serves to prevent the outer ring and rolling elements from coming out in the axial direction in cooperation with the flange; wherein, a hexagonal hole that is able to engage with a tightening tool is formed in the end surface of said stud, a lubricant supply port is formed that connects with a lubricating path continuing from the hexagonal hole, and a lubricant supply plug is inserted into the lubricant supply port that contains and fixes an elastic body having an air hole portion in its outer annular cover.

In addition, locking lips and locking operation cavities are formed in the back of the air hole portion of the elastic body.

In addition, dust-preventive lips are formed in the front end of the air hole portion of the elastic body.

In addition, a flange is provided in the collar portion of the outer annular cover.

DESCRIPTION OF THE PREFERRED EMBODIMENTS

Next, an explanation is provided of a track roller bearing with stud as an embodiment of the present invention with reference to the attached drawings.

Figure 8:
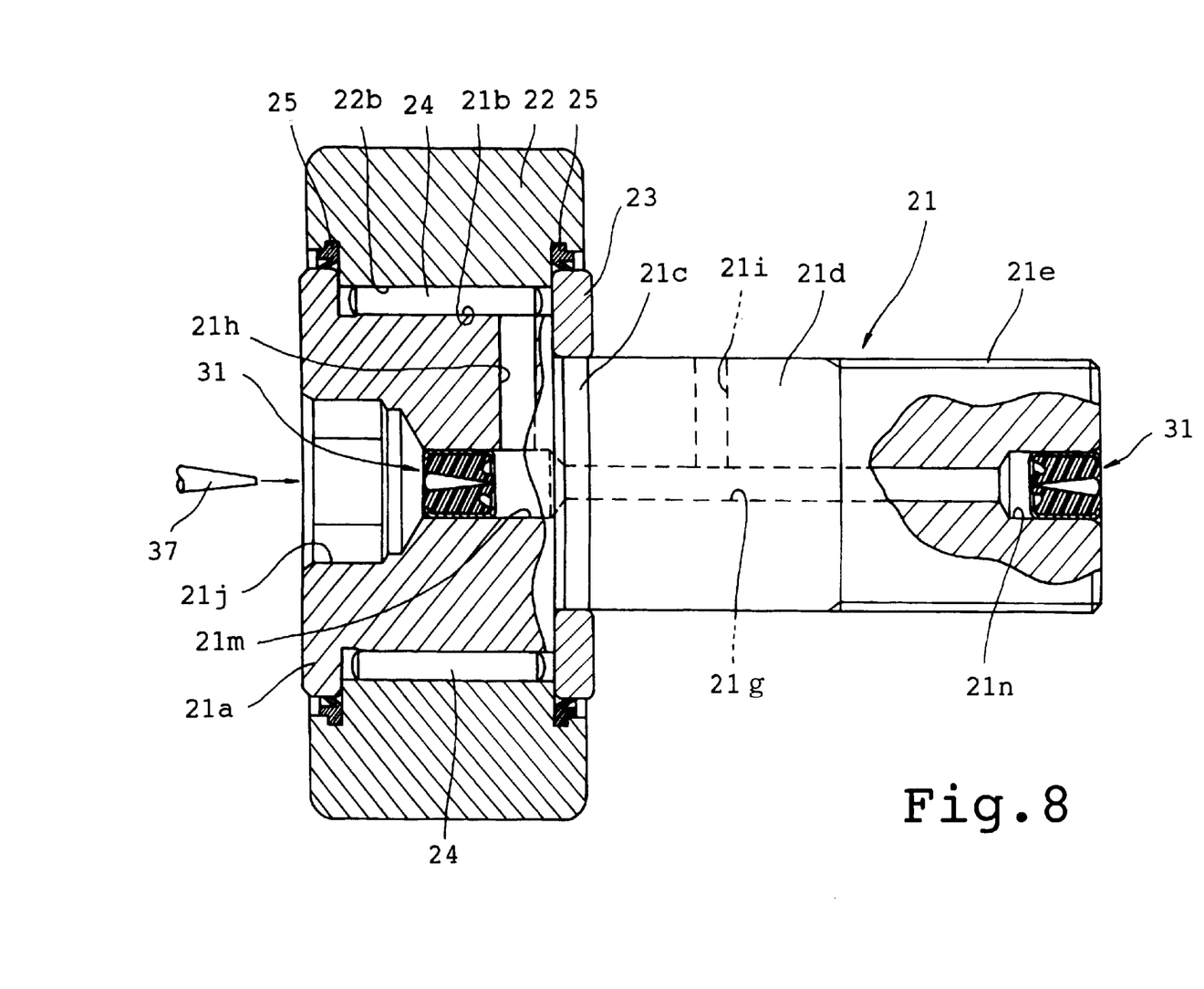
FIG. 8 is a front view, including a partial cross-section, of a track roller bearing with stud as an embodiment of the present invention.

As shown in FIG. 8, the track roller bearing with stud is equipped with stud 21 in the shape of a shaft and having a circular cross-section, outer ring 22, side plate 23, and rolling elements in the form of a plurality of needle-shaped rollers 24.

Stud 21 has, in order from one end surface, flange 21a, a track portion of which the outer circumference serves as track surface 21b, side plate engaging portion 21c having a smaller diameter than the track portion but a slightly larger diameter than the following attaching portion, attaching portion 21d that is attached to a housing or other part of a machine frame, and threaded portion 21e on the end of the stud 21 that cooperates with a nut to tighten and secure the stud 21.

The end of outer ring 22 is in the form of a step-shaped socket so as to contain flange 21a and side plate 23, respectively. One end of outer ring 22 is prevented from coming out in the axial direction by flange 21a. In addition, outer ring 22 is in the form of a thick-walled ring having a larger diameter than flange 21a and in which track surface 22b is formed in its inner circumference, and is inserted while allowing to rotate freely by means of rolling elements in the form of needle-shaped rollers 24 corresponding to track surface 21b of the stud 21.

A plurality of needle-shaped rollers 24 are juxtaposed between track surfaces 21b and 22b of stud 21 and outer ring 22.

Side plate 23 is located on the other end of outer ring 22 corresponding to flange 21a. It is in the form of a doughnut-shaped plate having a diameter similar to the outer diameter of the flange 21a. Its inner diameter portion engages with side plate engaging portion 21c of stud 21, and serves to prevent outer ring 22 and needle-shaped rollers 24 from coming out in the axial direction in cooperation with flange 21a.

Seal 25 made of synthetic rubber and so forth is juxtaposed between each of the outer surfaces of flange 21a and side plate 23 and outer ring 22. More specifically, the outer circumference portion of the seal 25 is attached to the inner circumference portion of outer ring 22 and a lip is formed in its inside. This lip makes sliding contact with the outer surfaces of flange 21a and side plate 23. As a result, the entry of foreign objects into the space in which needle-shaped rollers 24 are housed (within the track surface) can be prevented.

In a track roller bearing with stud composed in this manner, outer ring 22 normally rotates relative to stud 21.

Lubricant supply hole 21g for supplying lubricant is formed roughly over the entire length of stud 21 in the center of its axis. Lubricating holes 21h and 21i are opened in the lubricant supply hole 21g that are respectively connected to track surfaces 21b and attaching portion 21d. These lubricant supply hole 21g and lubricating holes 21h and 21i compose a lubricant lubricating path.

In addition, lubricant supply port 21n that is connected to this lubricating path is formed in one end surface on the side of the threaded portion 21e of stud 21.

Hexagonal hole 21j is formed in the end surface on the side of flange 21a in the center of its axis of stud 21. The hexagonal hole 21j is for tightening and securing stud 21 by causing the stud 21 to rotate by engaging a tightening tool such as a hexagon wrench with the hexagonal hole 21j. This hexagonal hole 21j is formed simultaneous to the formation of stud 21 itself by forging. Accordingly, the number of production steps is reduced enabling production costs to be held to a low level.

Here, a brief explanation is provided on the production process of stud 21.

To begin with, a long steel member is cut to a suitable length and used as the base material of the stud. This base material is then forged to obtain the parent form of stud 21. During this forging, the hexagonal hole 21j is also formed. Next, the track surface 21b is for me d by cutting (by cutting after quenching) in this parent form, threaded portion 21e is formed by cutting or rolling, and lubricant supply hole 21g along with lubricating holes 21h and 21i and lubricant supply port 21n are drilled with a drill.

Here, another lubricant supply port 21m is formed continuing from the hexagonal hole 21j in the hexagonal hole in stud 21. This lubricant supply port 21m is similarly formed with a drill, and is connected with lubricant supply hole 21g and lubricating hole 21h which form the lubricating path.

The lubricant supply ports 21m and 21n formed in both end surfaces of stud 21 are of the same diameter. Lubricant supply plug 31 is inserted into these lubricant supply ports 21m and 21n. More specifically, they are inserted by fitting tightly into lubricant supply ports 21m and 21n.

Here, a detailed description is provided regarding the lubricant supply plug 31.

Figure 9:
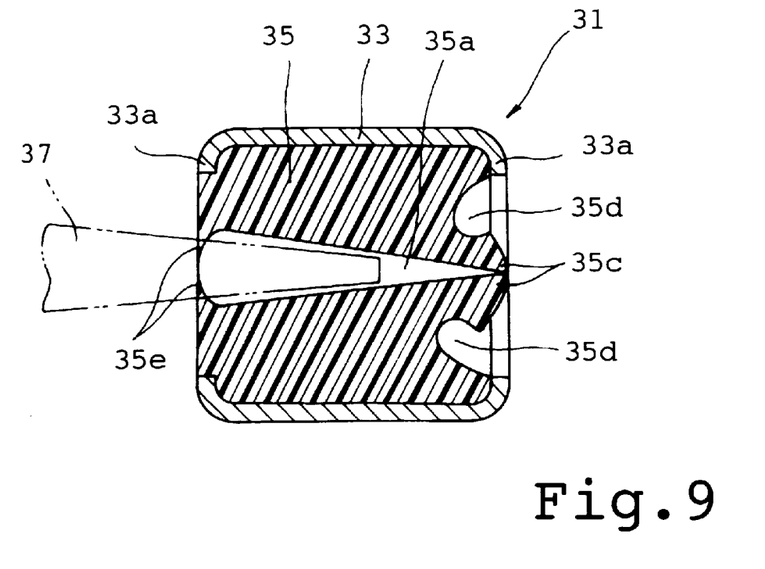
FIG. 9 is a cross-sectional view in the axial direction of a lubricant supply plug attached to the track roller bearing with stud shown in FIG. 8.

As shown in FIG. 9, lubricant supply plug 31 is composed of roughly cylindrical outer annular cover 33 and elastic body 35 contained and attached in this outer annular cover 33.

Outer annular cover 33 is obtained by press forming a thin steel sheet. Elastic body 35 is formed into a roughly cylindrical shape from soft rubber, other synthetic rubber or synthetic resin, and air hole portion 35a, the diameter of which gradually decreases from one end to the other end in the axial direction, is formed in its axial center.

Both ends of the above outer annular cover 33 are in the form of collar portions 33a which protrude to the inside. These collar portions 33a prevent the elastic body from coming out.

Locking lips 35c and locking operation cavities 35d are formed in the back of the air hole portion 35a in the elastic body 35.

In addition, dust-preventive lips 35e are formed in the front end of the air hole portion 35a in elastic body 35.

The track roller bearing with stud of the present embodiment is also installed on a machine tool and so forth in the same manner as that shown in FIG. 3. Prior to this installation, the lubricant supply plug 31 is inserted in at least one, and preferably both, of the lubricant supply ports 21m and 21n. After installation, a lubricant, for example grease, is then suitably injected through the lubricant supply plug 31 as necessary. More specifically, as shown in FIGS. 8 and 9, the end of lubricating jig 37 is inserted into the air hole portion 35a, pressure is applied to inject the grease after which the lubricating jig is removed.

The injected grease is supplied to each track surface 21b and 22b of stud 21 and outer ring 22 as well as rollers 24 after passing through lubricant supply hole 21g and lubricating hole 21h shown in FIG. 8.

When grease is filled in this manner, the internal pressure of the grease is applied to locking operation cavities 35d formed in elastic body 35 of lubricant supply plug 31. As a result, force acts in the direction in which locking lips 35c close to prevent leakage of grease.

In addition, as shown in FIG. 8, even in the case in which lubricant supply plugs 31 are inserted into both lubricant supply ports 21m and 21n, and grease is supplied from only one lubricant supply plug, the internal pressure of the grease is applied to locking operation cavities 35d of the other lubricant supply plug causing force to be applied in the direction in which locking lips 35c close and preventing leakage of grease. Namely, the other lubricant supply plug acts in the manner of an ordinary embedded plug in this case.

In addition, after the lubricating jig 37 has been pulled out, dust-preventive lips 35e formed in elastic body 35 of lubricant supply plug 31 close to prevent entrance of debris, dust and so forth into air hole portion 35a.

As has been described above, since lubricant supply port 21m continuing from the hexagonal hole 21j is formed in addition to lubricant supply port 21n on the side of threaded portion 21e of stud 21 in this track roller bearing with stud, and lubricant supply plugs 31 are disposed in these lubricant supply ports, lubrication work can be performed from either end surface of stud 21 resulting in easy handling.

In addition, since the lubricant supply plug 31 is located farther to the back (inside lubricant supply port 21m) of the hexagonal hole 21j, when fitting a hexagonal wrench in the hexagonal hole 21j in order to remove this track roller bearing with stud from a machine tool and so forth, removal work can be performed easily without having to remove lubricant supply plug 31.

In addition, although a grease nipple and embedded plug were conventionally attached to the lubricant supply ports after attaching a track roller bearing with stud to a machine tool and so forth, since the lubricant supply plug 31 is attached inside stud 21 in advance, handling is made easier.

Moreover, the need for an embedded plug can be eliminated by disposing the lubricant supply plug 31.

Figure 10:
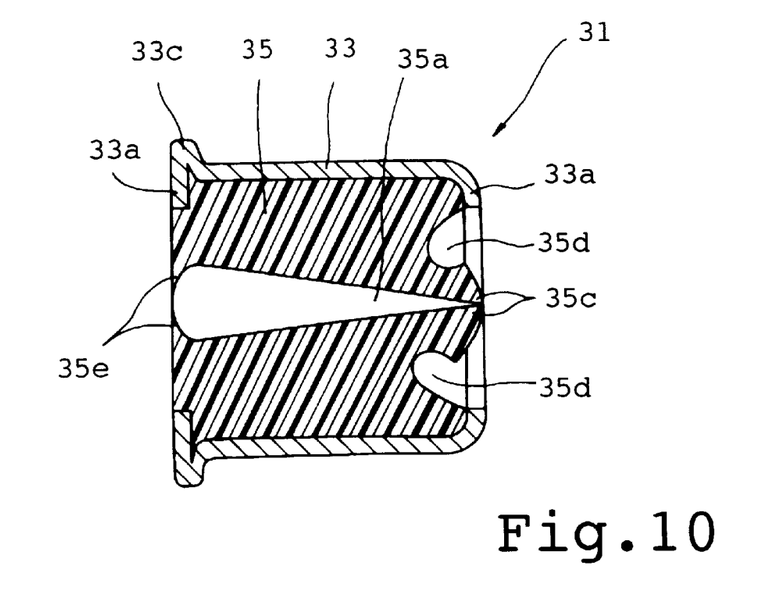
FIG. 10 is a cross-sectional view in the axial direction of a variation of the lubricant supply plug attached to the track roller bearing with stud shown in FIG. 8.

FIG. 10 shows a variation of lubricant supply plug 31. In this lubricant supply plug, flange 33c is provided on collar 33a of outer annular cover 33. This flange 33c is provided in order to determine the position of the lubricant supply plug in the axial direction, and especially to position the lubricant supply plug at the bottom of hexagonal hole 21j, when inserting and fixing the lubricant supply plug in the lubricant supply ports 21m and 21n.

Furthermore, although track roller bearing with stud has rollers 24 that are used in the form of rolling elements in the present embodiment, this embodiment may also be a track roller bearing with stud that uses balls in the form of the rolling elements.

In addition, although a hexagonal hole is formed on the flange side in the present embodiment, depending on the particular case, hexagonal holes may be formed on either side or both sides as is suitable, provided it can be applied to a lubricant supply port that continues from a hexagonal hole.

As has been explained above, in the track roller bearing with stud according to the present invention, since a hexagonal hole provided to allow a stud to be rotated by a tightening tool can be formed by forging simultaneous to forging of the stud itself, production cost can be held to a low level.

In addition, since a lubricant supply port continuing from the hexagonal hole is provided in addition to a lubricant supply port on the side of the threaded portion of the stud and lubricant supply plugs are disposed in their lubricant supply ports, lubrication work can be performed from either end surface of the stud, thereby resulting in easier handling.

In addition, since the lubricant supply plug is located farther to the back of the hexagonal hole, when fitting a hexagonal wrench in the hexagonal hole in order to remove this track roller bearing with stud from a machine tool and so forth, removal work can be performed easily without having to remove the lubricant supply plug.

In addition, although a grease nipple and embedded plugs were conventionally attached to the lubricant supply ports after attaching a track roller bearing with stud to a machine tool and so forth, since the lubricant supply plug is attached inside the stud in advance, handling is made easier.

What is claimed is:

1. A track roller bearing with stud, comprising:
    a stud in the shape of a shaft, said stud comprising in order from one end surface:
        a flange,
        a track portion having an outer circumference which serves as a track surface,
        a side plate engaging portion,
        an attaching portion, and
        a threaded portion;
    an outer ring, said outer ring being in the form of a thick-walled ring having a diameter larger than an outer diameter of said flange, said outer ring having a track surface formed on its inner circumference and said outer ring being inserted adjacent said stud while being allowed to rotate freely corresponding to the track surface of said stud;
    wherein said flange prevents one end of said outer ring from moving out in an axial direction;
    a plurality of rolling elements juxtaposed between each said track surface of said stud and said outer ring;
    a side plate in the form of a doughnut-shaped plate similar in size to the outer diameter of said flange, said side plate located on the other end of said outer ring from said flange, an inner diameter portion of said side plate which engages with said side plate engaging portion, and serves to prevent said outer ring and rolling elements, in cooperation with said flange, from moving out in the axial direction;

said track roller bearing with stud further comprising:
        a hexagonal hole formed to engage with a tightening tool being disposed in said end surface of said stud;
        a lubricant supply hole for supplying lubricant being disposed along an axis of said stud between said attaching portion and each said track surface;
        a first lubricant supply port which connects with said lubricant supply hole and formed continuing from said hexagonal hole,
        a second lubricant supply port which connects with said lubricant supply hole formed at said threaded portion; and
        a lubricant supply plug having a substantially cylindrical body and an outer annular cover, said outer annular cover having a collar portion, said lubricant supply plug being inserted into one of said first lubricant supply port and said second lubricant supply port, said lubricant supply plug comprising:
            an elastic body having an air hole portion, said elastic body being contained and attached within said outer annular cover by said collar portion, such that said collar portion is bent inward at forward and rear portions of said cylindrical body to retain said elastic body within said annular cover.

2. A track roller bearing with stud as set forth in claim 1, wherein said elastic body further comprises:
    locking lips, and
    locking operation cavities, said locking lips and locking operation cavities being formed in a rear portion of said air hole portion of said elastic body, said locking lips and said locking operation cavities cooperating to close said air hole portion and prevent leakage of said lubricant.

3. A track roller bearing with stud as set forth in claim 1, wherein said elastic body further comprises:
    dust-preventive lips formed in a front end of said air hole portion of said elastic body.

4. A track roller bearing with stud as set forth in claim 1, wherein said lubricant supply plug further comprises a flange provided in the collar portion of said outer annular cover.

* * * * *